Nov. 5, 1963    G. F. COOPER ETAL    3,109,983
CIRCUITS WITH DISTRIBUTED CHARACTERISTICS
Filed May 2, 1957    6 Sheets-Sheet 1

INVENTORS
GLENN F. COOPER
ALAN B. SMITH
BY Connolly and Hertz
ATTORNEYS

INVENTORS
GLENN F. COOPER
ALAN B. SMITH

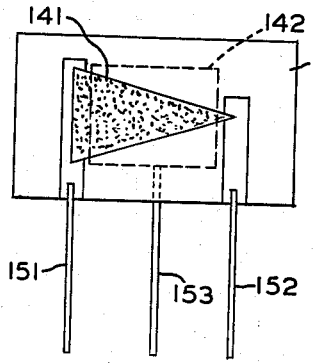
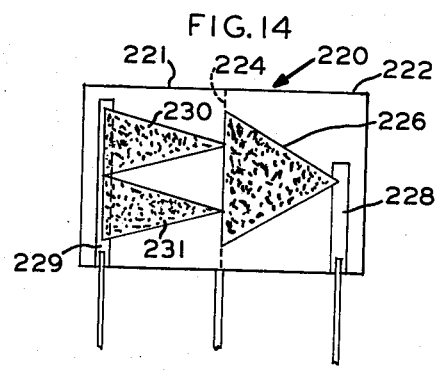
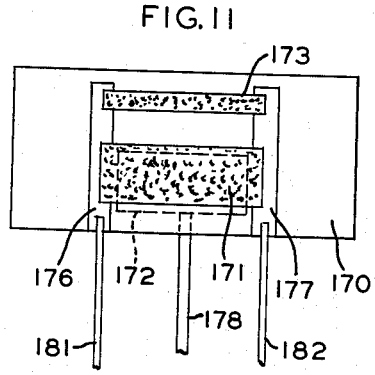
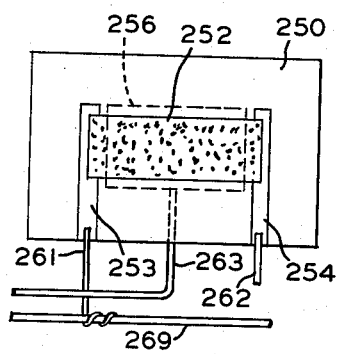
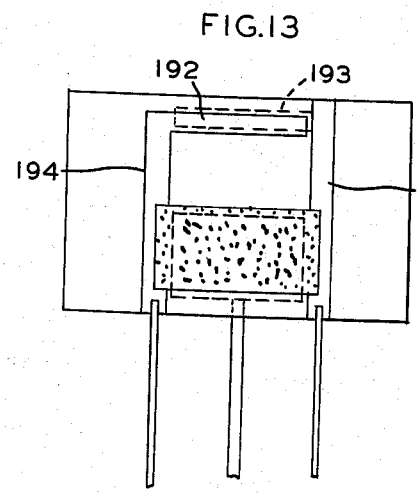
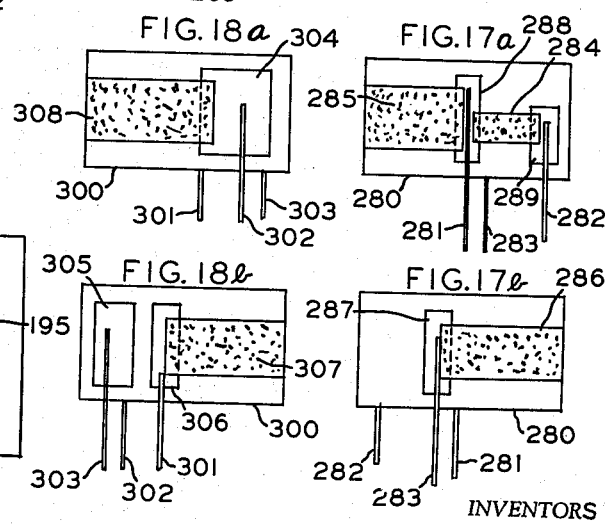
INVENTORS
GLENN F. COOPER
ALAN B. SMITH

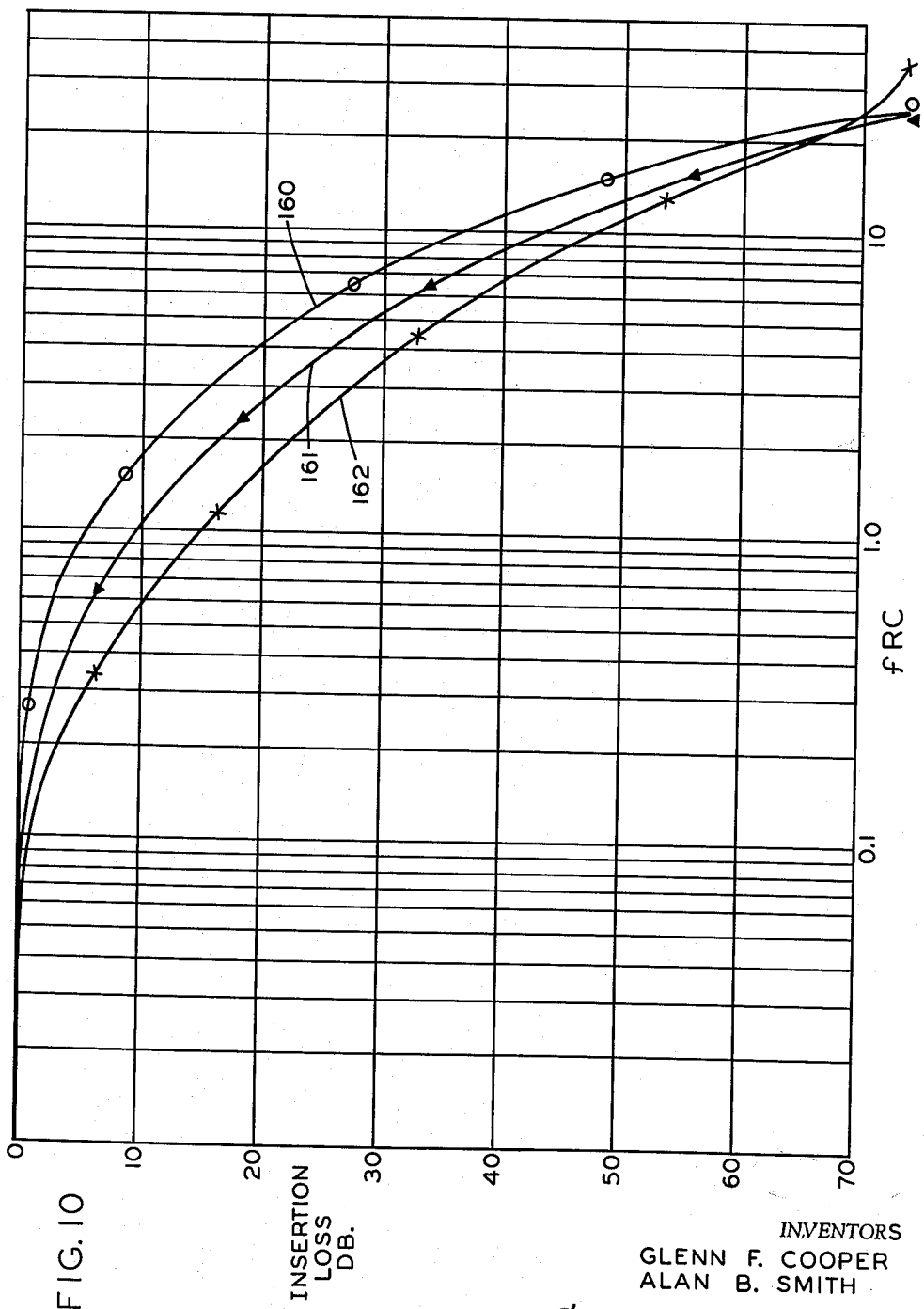

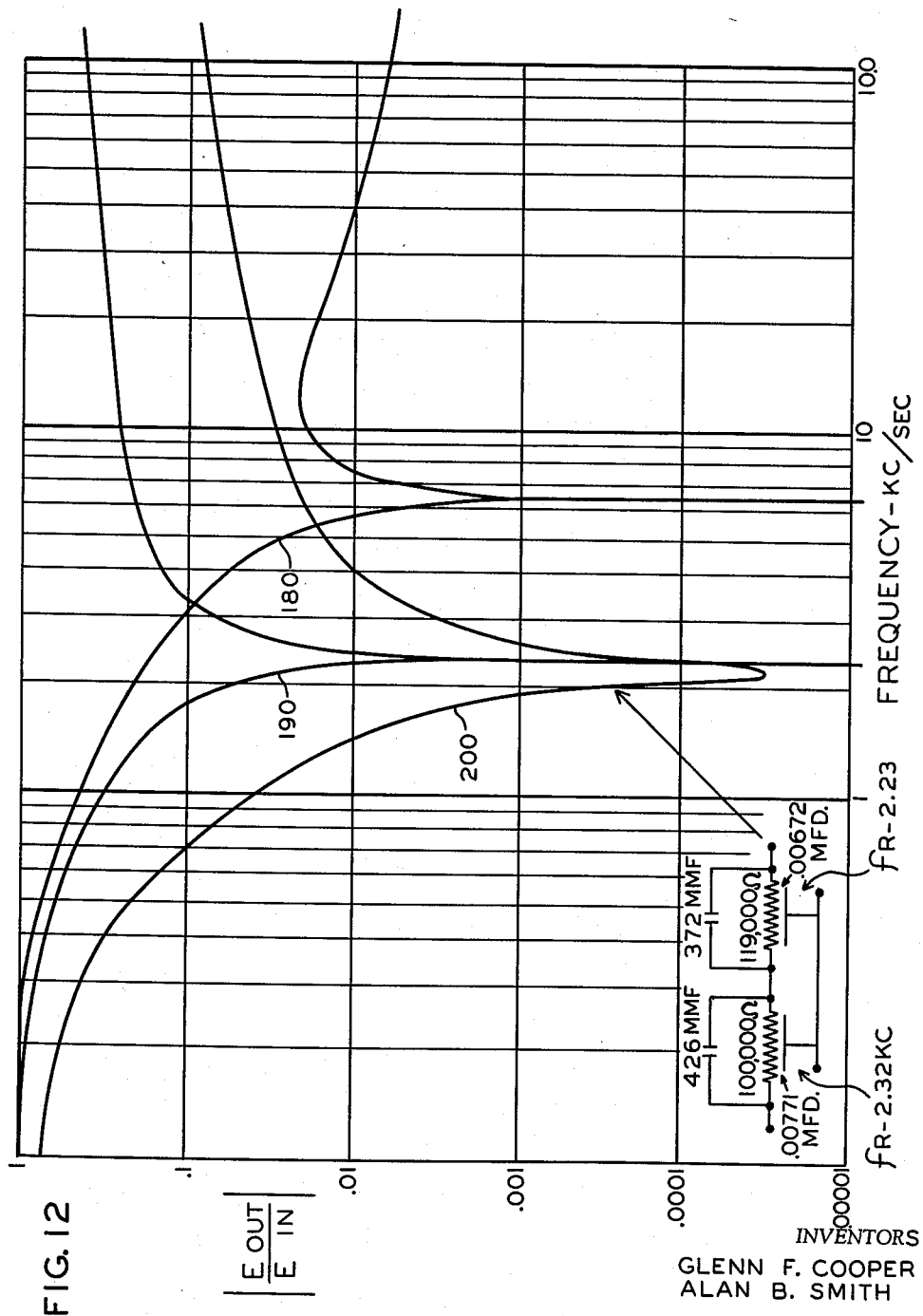

3,109,983
CIRCUITS WITH DISTRIBUTED
CHARACTERISTICS
Glenn F. Cooper, 38 Notch Road, and Alan B. Smith, 207 Eagle St., both of North Adams, Mass.
Filed May 2, 1957, Ser. No. 656,533
8 Claims. (Cl. 323—74)

The present invention relates to electric circuits for carrying signals and more particularly such circuits in which there is a distributed characteristic such as a capacitance.

Among the objects of the present invention is the provision of novel circuit components and circuits of the above type that have particularly desirable characteristics.

The above as well as additional objects of the present invention will be more clearly understood from the following description of several of its exemplifications, reference being made to the accompanying drawings wherein:

FIGS. 8 and 9 are plan views similar to FIG. 1 of further modified constructions;

FIG. 10 is a graphical representation of the characteristics of the construction of FIG. 9;

FIGS. 11 and 13 are plan views of further constructions in accordance with this invention;

FIG. 12 is a graphical representation of the characteristics of the constructions of FIGS. 11 and 13;

FIG. 14 is a still further modification of the invention;

FIG. 15 is a view of a circuit combination exemplifying another phase of the present invention;

FIGS. 17 and 18 are plan views of additional circuit component modifications illustrative of the present invention.

In each of these figures (a) and (b) views are shown, with the (a) view showing one side of the component and the (b) view showing the opposite side.

A very desirable circuit component according to the present invention has a dielectric stratum with separate elongated resistance layers opposing each other on opposite faces of the stratum, the layers being free of terminal connections except for a first terminal connection at one end of one layer, and a second terminal connection at the longitudinally opposite end of the other layer.

Where a relatively large capacitance is required between the two resistance layers and the bulk of the component is to be kept small, it is very convenient to use as the dielectric stratum a high dielectric constant ceramic of a barium titanate type such as one having a dielectric constant no smaller than 500 and a thickness no greater than 25 mils. Components of this type are very effectively used as by-pass returns for the taps of compensated volume controls, as well as in arc suppressing shunts for switching contacts in relays and similar devices. For small capacitances, a dielectric stratum with a very low dielectric constant is suitable and the dielectric thickness can be much larger. This type of construction is very effective for feedback neutralization of transistor amplifiers.

Figure 1:
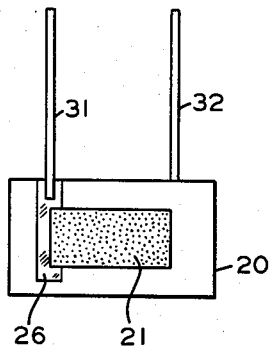
FIG. 1 is a plan view of a circuit component according to the present invention.
Figure 2:
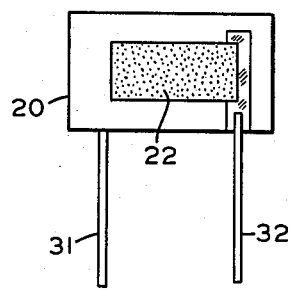
FIG. 2 is a view of the reverse side of the component of FIG. 1.

FIGS. 1 and 2 show a typical circuit component embodying the present invention. A ceramic plate 20 has on its opposite faces elongated resistance coatings 21, 22. These coatings oppose each other so that they are in capacitive relationship. At one end of coating 21, a terminal lead wire 31 is connected by means of a fired silver line 26 to which the terminal is soldered and over which the end of the coating 21 extends. At the longitudinally opposite end of coating 22 a lead 32 is connected in a manner similar to that shown for lead 31. Although the coatings have some definite length, the length can be larger, smaller or equal to the width.

The ceramic plate can be made in the manner described in U.S. Patent 2,402,515, granted June 18, 1946, and the silver and resistance layers applied as shown in the above patent or in the National Bureau of Standards Circular 468 issued November 15, 1947, entitled "Printed Circuit Techniques." Any highly conductive material can be used in place of the silver. Such metals as palladium, platinum, gold and nickel are representative of suitable alternate metals. These conductive materials need not be soldered to their leads, but can be pressed as by spring tension or held in any other way.

Figure 3:
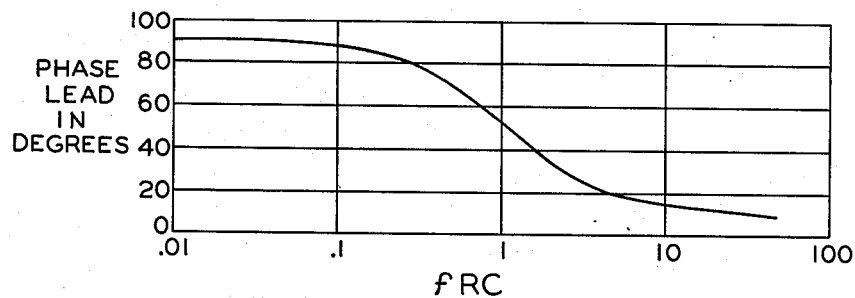
FIG. 3 is a graph showing one type of result obtained with the circuit component of FIG. 1.

For the construction of FIGS. 1 and 2, FIG. 3 shows the phase angle between the current flowing from lead 31 to lead 32, as compared to the voltage applied between these points as a function of frequency ($f$), total resistance of the two electrodes ($R$) and D.C. capacity between the electrodes ($C$). For a typical case resistance layers 21, 22 might be both one inch long and one-quarter inch wide and have a nominal resistance of 12,500 ohms per square (50,000 ohms in each layer), with a dielectric plate having a dielectric constant of 3500 and a thickness of 20 mils. The performance of this device in this case would be equivalent to a 0.01 microfarad capacitor in series with a 25,000 ohm resistor. As with this construction R would equal 100,000 ohms and C, .01 microfarad, a frequency of 1,000 cycles would correspond to $FRC=1$ in FIGURE 3. It will be noted that at low frequencies there is a 90° phase angle lead so that the combination behaves essentially like a capacitive reactance. As the frequency increases the phase lead diminishes and the combination behaves more and more like a purely resistive impedance. The phase lead appears to get no smaller than 5 to 10°, apparently because of the stray shunting capacitance between the leads 31, 32, particularly between the silver contacts for these leads. Where it is important to have the minimum possible phase lead at high frequencies, the stray capacitance can be reduced by separating the metal connection strips from the dielectric plate by an intervening layer of low dielectric material, as described in U.S. Patent 2,694,185, granted November 1, 1954, or by having the dielectric plate made of sections having low dielectric constant in the portions carrying the metal layers, with a high dielectric constant portion in the intervening area. Such a multiple dielectric constant body is described in U.S. Patent 2,648,804 granted August 11, 1953. The low dielectric constant portions preferably extend toward each other at least about 1/32 inch beyond the metal layer.

Figure 4:
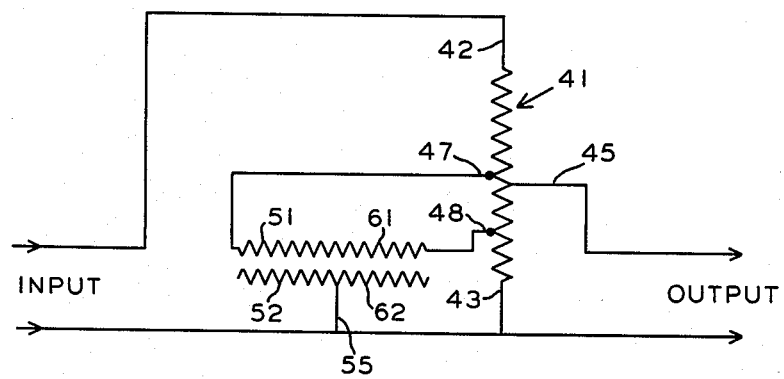
FIG. 4 is a schematic illustration of a volume control circuit incorporating the present invention.

FIG. 4 shows a pair of the above circuit components in a compensated volume control circuit. A resistance potentiometer 41 is here illustrated as having its two ends 42, 43 connected to an input circuit, with a slider 45 running to an output circuit along with one of the potentiometer ends 43. Fixed taps 47 and 48 on the potentiometer are separately connected to potentiometer end 43 through separate assemblies of the type shown in FIG. 1. These assemblies are represented by the pairs of opposed resistance symbols 51, 52 and 61, 62, respectively. For improved simplicity, a single terminal lead 55 can be shared by resistances 52, 62 of the respective pairs.

The combination of FIG. 4 makes a very effective tone compensating volume control. The resistances 51, 52 and 61, 62, and the distributed capacitances between the respective pairs of resistances are selected to give the desired operation. Thus, the resistances of each pair can be equal, each resistance pair having four times the resistance normally used in such by-passes and the capacitance selected by having the D.C. capacitance between the resistances equal to the standard compensation capacitance. By way of example, a compensated tone control, according to FIG. 4, can have a half megohm potentiometer with taps at the 100,000 and 200,000 ohm resistance levels with respect to the return terminal 43, and with each by-pass connection differing only in the resistor values, the resistances of the higher tap being each 94,000 ohms for each electrode and the lower tap being each 44,000 ohms with a D.C. capacitance of 0.01 microfarad in each tap unit. The performance will then be almost identical with that which would be obtained by bypassing the taps with a 0.01 microfarad capacitor and a 47,000 ohm resistor in the first case and a 0.01 microfarad capacitor and a 22,000 ohm resistor in the other.

The above taps can be readily provided by arranging suitable supplemental resistor coating portions to the supporting disc that usually carries the resistor strip of the volume control potentiometer. These supplemental coatings can be placed on both sides of the support so that the support becomes the active capacitance dielectric.

Figure 5A:
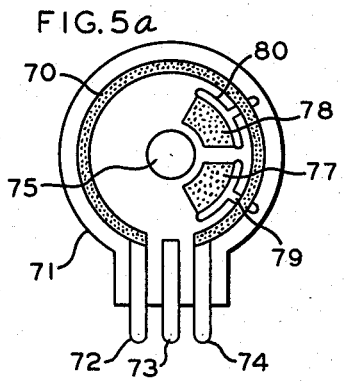
FIG. 5 is a schematic illustration of a volume control connected in the manner shown in FIG. 4.
Figure 5B:
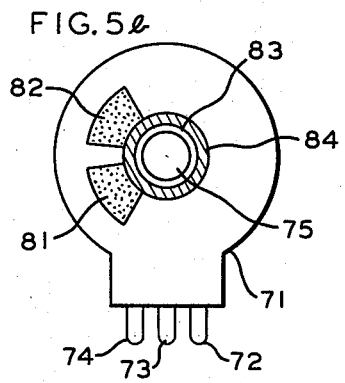

FIGS. 5(a) and 5(b) show the two sides of a volume control incorporating a distributed circuit in accordance with the teachings of our invention. The principal resistance of this volume control is the resistance path 70 of generally arcuate shape, which is deposited on one face of high dielectric constant ceramic supporting plate 71. Resistance 70 is terminated at its two ends by tabs or leads 72 and 74. Contact to resistance path 70 is made through a conventional slider (not shown) which is mounted for rotation on shaft 75, although insulated therefrom. The slider is electrically connected to the circuit being controlled through terminal tab 73. Distributed circuit electrodes 77 and 78 of resistance material, which need not be of the same material as resistance path 70, are mounted on supporting plate 71 in spaced relation to each other and to path 70. Conducting paths 79 and 80, preferably of silver fired onto ceramic plate 71, electrically connect electrodes 77 and 78 to path 70. Electrodes 81 and 82, shown in FIG. 5(b) on the opposite face of plate 71, are positioned in mating registration with electrodes 77 and 78 to comprise the capacitive portions of our distributed circuit. A shaft bushing 83 provides a mounting for shaft 75 and provides a conductive path to ground for electrodes 81 and 82 through conductive coating 84 which is fired to the ceramic 71 in contact with bushing 83.

Conventional cover members may be provided for each face of our volume control to serve as protection against contamination during storage and use. Also suitable mounting means (not part of this invention) may be provided either on the shaft bushing or on the cover members to position the volume control for use. In applications where shunt capacity must be kept to a minimum, an undercoat of a low dielectric constant material may be provided beneath the arcuate resistance coating 70, in the manner described in the aforementioned U.S. Patent 2,694,185.

Figure 6:
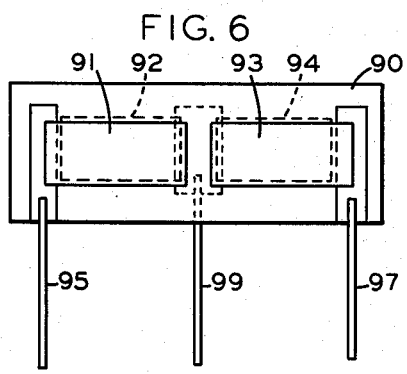
FIG. 6 is a plan view of a modified circuit component particularly suited for use in the combination of FIG. 4.

FIG. 6 shows a dual assembly in accordance with the present invention. Here a dielectric plate 90 carries on one face two elongated resistor layers 91, 93 having leads 95, 97 at opposite extremes. On the other face of the plate there are correspondingly positioned mating resistive layers 92, 94 having a single terminal 99 to which the adjacent ends are both connected. The construction of FIG. 6 is particularly suited for those circuit arrangements in which there are used two assemblies of the present invention, such as for example a volume control having two tone compensating taps. Leads 95 and 97 can be connected to the respective taps, and lead 99 connected to the signal return conductor.

Figure 7:
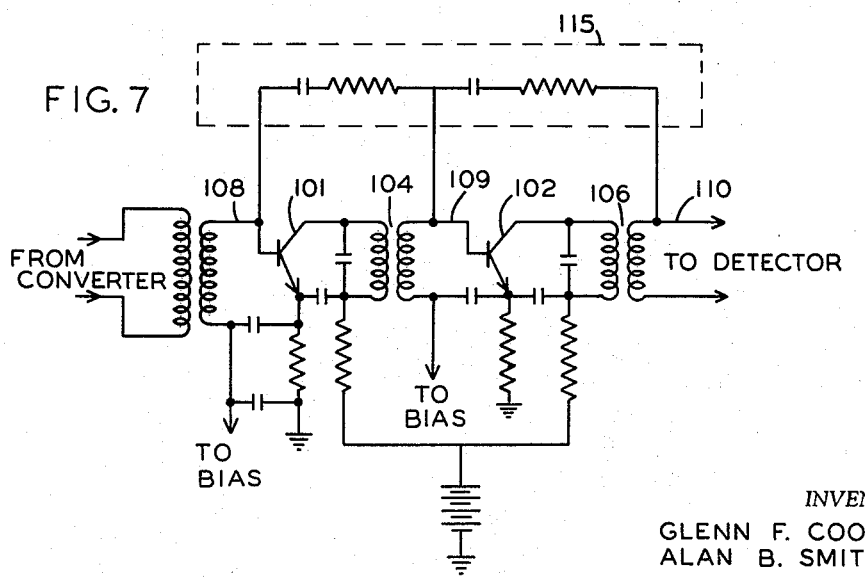
FIG. 7 is an amplification network incorporating the present invention.

FIG. 7 illustrates a typical transistor intermediate frequency amplification network. This network has two transistor stages, each built around a different transistor 101, 102, the stages being coupled to each other by transformer 104 and having an output transformer 106. The transistors are shown as of the N-P-N junction type connected in a common emitter type of amplifier, and the transformers 104, 106 poled so as to provide a 180° phase reversal that balances the 180° phase reversal effected by the common emitter amplification. Accordingly, the output conductor 110 carries signals having the same phase as conductor 109 which supplies the input signal to transistor 102. Correspondingly, the phase at conductor 109 is the same as that for the input conductor 108 of the previous stage. Neutralizing feedback across each stage is supplied by assembly 115 which can be identical to that shown in FIG. 6, leads 95, 97 going to conductors 108 and 110, and lead 99 going to conductor 109.

It is preferred that the resistance and capacitance of the assemblies of the present invention both be distributed over an appreciable area. Thus the resistor layer should have a length in the direction of signal passage of at least about ⅛ inch. The longer the better, but a length of more than 1½ inches generally makes the assembly too large for use with ceramic supports.

Figure 8:
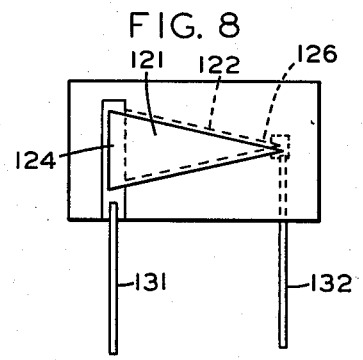

The impedance characteristics of the assembly of the invention can be modified by tapering the resistance layers. FIG. 8 shows such a modification of the construction of FIG. 1. Here resistance layers 121 and 122 are made triangular with the wide portion 124 of layer 121 connected to lead 131 and the narrow end 126 of coating 122 connected to lead 132. Because of the tapering, the construction of FIG. 8 shows gradual reciprocal changes of the effective resistance and capacitance. In other words, as the current flows from lead 131 to lead 132, each incremental portion of the path has a greater resistance and a lower capacitance than the preceding portion. This steepens the phase angle change with frequency.

It is not essential that the opposed coatings of the present invention be of the same size or shape, or that they overlap exactly. An offset in any direction up to 10% of the active current carrying dimension in that direction has substantially no effect. One coating can also be wider and/or longer than the other, and this is in fact desirable for simplifying registration problems.

The tapered feature is also of value in connection with low pass filters. FIG. 9 shows such a low pass filter in the form of a plate 140 having a triangular resistance coating 141 on one face and a rectangular highly conductive metal coating 142 on the opposite face. The wide and pointed ends of resistive coating 141 are connected respectively to lead 151, 152 and another lead 153 is connected to an intermediate portion of the conductive coating 142, although it can be connected at any other point on that coating. The effect of this tapering in such a combination is to sharpen the filtering action if the signals go through the resistive coating 141 from lead 151 to lead 152. This is illustrated in FIG. 10 where the insertion loss is plotted as a function of frequency $f$, resistance R, and D.C. capacity C. Curve 160 shows the transfer characteristics versus FRC for the construction of FIG. 9 in the sharpening direction. For example, the resistance layer could have a resistance of 53,000 ohms between leads 151, 152, with a length of 2 centimeters and tapering from 3 centimeters wide to 0.1 centimeter, the D.C. capacitance being 0.025 microfarad. In this case, a frequency of 752 cycles would correspond to an FRC of 1. Curve 161 shows the characteristics of a unit having the same overall resistance and capacitance, but having the resistance layer rectangular. It should be noted that by reversing the signal direction in the construction of FIG. 9, the transfer characteristics are made less steep, as indicated by curve 162. However, the shallower attenuation slope is accompanied by a slower change in phase shift and this is useful to provide less phase shift for any predetermined attenuation. Conversely, the steeper attenuation gives a greater phase shift for any desired attenuation and is particularly suited in feedback networks of phase shift oscillators.

The sharpness of filtering can also be increased by bridging the input and output terminals of the low pass filter such as that of FIG. 9 with a separate impedance which may be any combination of resistance, capacitance, and/or inductance. A construction of this type in which no tapering is used is shown in FIG. 11. Here a plate 170 carries on one face a first generally rectangular resistance layer 171 and a second generally rectangular resistance coating 173. On the other face it carries a conductive coating 172 that opposes the resistance coating 171. Resistance coating 173 is connected in parallel by means of silver terminals 176, 177 to layer 171. Leads 181, 182 are connected to the respective terminals and a separate terminal lead 178 is connected to layer 172. FIG. 12 shows graphically a curve 180 which gives the insertion loss of the construction of FIG. 11 where the D.C. capacitance provided by the plate is 0.013 microfarad, layer 171 has a resistance of 62,000 ohms, and layer 173 a resistance of 292,000 ohms. It will be noted that the transfer characteristics are quite steep and that the unit is an infinite rejection filter for a specific frequency. Above that frequency the unit passes signals. The characteristics of FIG. 12 are obtained regardless of the magnitude of the spacing between coatings 171 and 173. In fact, these coatings may be run together and applied as an integral unit, so long as coating 172 does not oppose the portion of the unit corresponding to coating 173.

To get a rejection notch of infinite characteristics, the ratio of resistance 173 to resistance 171 should be about 4.7 with the stray capacitance that is ordinarily encountered. With minimum stray capacitance, this ratio approaches 4.57. The notch can be broadened at a sacrifice of its depth, by decreasing the resistance ratio to as little as 3, or increasing it to as much as 7.

FIG. 12 also shows a curve 190 for an assembly in which the bridging resistor 173 is replaced by a bridging capacitance of 660 micro-microfarads. Such a unit is illustrated in FIG. 13, where the bridging capacitance is provided by extensions 192 and 193 of the resistance layer connection strips 194 and 195. As shown, one of the extensions can be connected across the edge of the plate and over to the reverse face to oppose the other extension. Alternatively, the bridging capacitance can be provided by edge effect with both extensions on the same face of the plate and in close proximity.

For infinite rejection in this embodiment, the ratio of the larger capacitance to the smaller is typically about 20 and with minimum stray capacitance it approaches 18. If maximum rejection is not desired, the ratio can be in the range of from 10 to 40.

The constructions of FIGS. 11 and 13 can also have tapered resistance layers to steepen even further the transfer characteristics. On the other hand, the construction of FIG. 8 can also have only one of the resistance layers tapered. In this modification the steepness of the transfer is not changed as much as with both layers tapered. In general, a taper of at least 15° as measured at the vertex angle, where the tapering edges intersect, is desired. A taper of more than about 135° makes the coating too short. However, the taper need not be uniform nor symmetrical. For instance, one or both longitudinal side edges of the coating layer can be curved. The narrow end of the taper should be no more than one-fourth as wide as the wide end to obtain a significant change.

Instead of having the plates rectangular as illustrated in the above figures, they can be oval, circular, or even polygonal, or any other shape. The plates can also be arched or curved, rather than flat, and the units can for example have a tubular dielectric with the coatings on the inner and outer surfaces of the tube.

As indicated above, the effective resistivity of the construction of FIG. 1, when in a circuit as in FIG. 7, is one-half the resistance of an individual layer 21, when both layers have the same resistance. However, these resistances need not be identical, but can vary from a ratio of 3:1 to 1:3 without appreciably changing the operation.

As the resistances get more unequal, the characteristics change somewhat, particularly at the higher frequencies. For example, one of the resistive coatings can have its resistivity reduced to zero, as by replacing it with a metal layer, and the phase angle will then approach −45° instead of zero degrees, as in FIG. 3. A corresponding change in impedance also takes place. Instead of approaching a value ¼ that of the overall resistance, as in the case with equal or substantially equal resistance layer pairs, the impedance in this construction continues to drop with increasing frequencies, at a rate of about 10 decibels per decade.

Where the above-described tapering is used, it can be effected by varying the thickness of the resistor film and/or the resistivity of the film instead of its width. The capacitance can also be tapered by varying the dielectric constant and/or the dielectric thickness. This tapering can be stepwise rather than absolutely uniform, and any pair or set of the above tapering techniques can be used together. Also the resistances can be tapered at a different rate than the capacitance, although this will not provide the maximum change in steepness.

FIG. 14 illustrates a tapered unit which provides a considerable range of taper in very compact form. The unit is built on a plate 220 generally similar to that of the construction of FIG. 9, but having a left hand portion 221 made of material having a dielectric constant ten times as high as that of the right hand portion 222. These portions are sintered together, as indicated by the dash line 224. On the right hand portion a triangular resistor coating 226 extends from terminal lead layer 228 to the juncture line 224, and over this length changes its transverse width by a factor of 10 to 1. On the left hand portion 221, a pair of smaller resistor triangles 230, 231 extend from the juncture line to another lead terminal 229, and over this distance change their combined width also by a factor of 10 to 1. The specific resistance of the coatings 230, 231 are ⅒ that of the coating 226, so that the overall result is to get a unit gradation of resistance over a range of 100 to 1.

On the opposite surface of the plate 220, there is applied a metal coating corresponding in shape to the combination of resistor coatings, and leads are applied as in the construction of FIG. 9.

The construction of FIG. 14 shows a capacitance taper of 100 to 1 and an inverse resistance taper also of 100 to 1, so that the R/C ratio changes by a factor of 10,000. Notwithstanding this large variation, the units can be easily manufactured with a high accuracy on dielectric plates about an inch long and a half-inch wide.

The two triangular coatings 230, 231, as shown in FIG. 14, can if desired be merged into one triangular coating shaped just like coating 226. Alternatively, the two coatings 230, 231 can be replaced by three or more narrower coatings. Furthermore, the integral coating 226 can have its position interchanged with that of the multiple coatings 230, 231.

Units such as shown in FIGS. 1, 2, 6, 8, 9, 11, 13, 14, 15, 17 and 18 can be left uncovered, or they can be protected by a covering such as the resin dip coating described in U.S. Patent 2,665,376 granted July 5, 1954.

Instead of having the conductive strata of the present invention applied by firing, they can be merely cemented in place or frictionally held as by an external clamping arrangement. The resistive layers can also be in the form of independently self-supporting strips cemented or frictionally held. Such alternate constructions are quite suitable for use with low dielectric constant plates such as those made of steatite or mica, or even Bakelite. With such materials, the minute air gaps that cannot be avoided when separate members are clamped against the dielectric, do not significantly detract from the valuable capacitance.

Also in the constructions of FIGS. 11 and 13, the bridging resistor 173 or bridging capacitor 192, 193 can be supplied by a separate component not mounted on the supporting plate with the remainder of the components.

FIG. 15 shows a circuit combination which uses distributed capacitance to obtain an unusual effect. The combination is built around a supporting plate 250 on one face of which is a resistor layer 252 extending between terminals coatings 253, 254. On the opposite face and opposing resistive coating 252 is a conductive coating 256. Leads 261, 262 and 263 are secured to the various conductive coatings; and the input to this device is applied between leads 263 and 261, the output being taken between leads 262 and 261.

Figure 16:
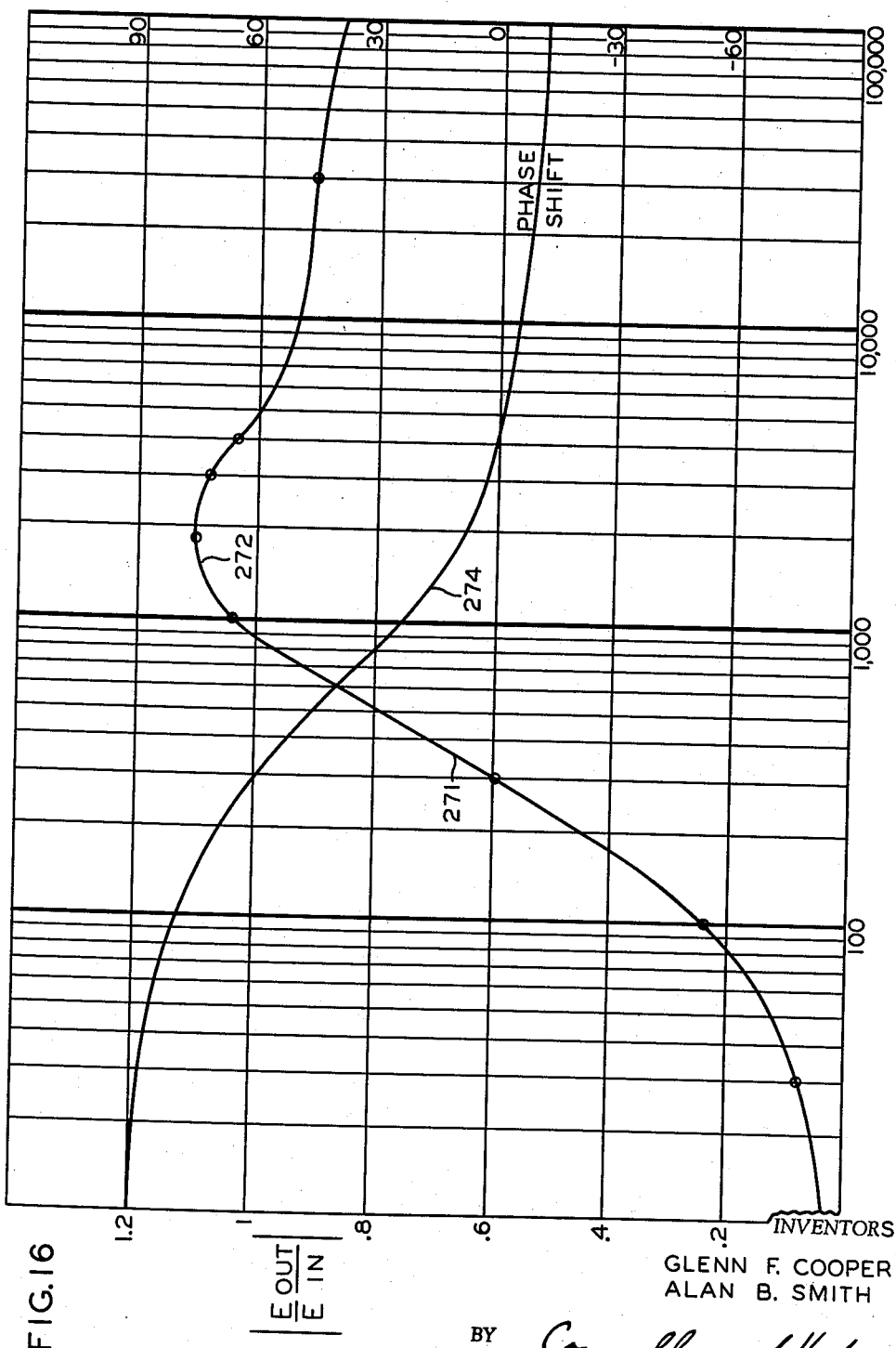
FIG. 16 is a graphical representation of the characteristics of the combination of FIG. 15.

The operation of the combination of FIG. 15 is shown in FIG. 16 where curve 271 represents the ratio of output signal voltage to input voltage over a range of frequencies for a typical unit of this construction. The characteristic of this device is desirable, as it is capable of voltage gain rather than attenuation over a range of frequencies. This gain may be seen to occur at 272 in FIG. 16. Also, this filter is capable of the opposite of time delay, i.e., the output voltage leads the input voltage in the steady state over most of the working range as is shown by the curve of phase shift versus frequency 274. Also, this device has useful high pass filter characteristics. As shown by FIG. 16, the output signal voltage leads the input signal voltage by 90° at very low frequencies, and the lead angle drops off with rising frequency. Instead of stopping at 0°, however, the phase shift continues beyond 0, and at the higher frequencies the output signal voltage actually lags behind the input signal voltage a few degrees. This small lag is due to the loading effect of the measuring devices used to plot these curves and with an open circuit on the output at high frequencies, the phase angle would approach zero and the attenuation would approach one. The above curves were obtained by the combination in which the distributed capacitance between layer 252 and layer 256 was 0.013 microfarad, and the resistance of layer 252 between its terminals was 60,000 ohms.

It is possible to control the amount of voltage gain by tapering resistance area 252 in FIG. 15 as area 141 is tapered in FIG. 9. If the unit is tapered so that the end of 252 connected to lead 261 is made wider than the other end, an increase in output voltage is achieved. Tapering in the opposite direction gives the reverse effect. A tapering scheme similar to that shown in FIG. 14 may also be used to obtain higher tapering ratios. With a device of this type, voltage gains as high as 1.25 have been observed.

In addition to its usefulness as a high pass filter, this device would find application in circuits where a component having voltage gain would be needed. An example of this would be a cathode follower oscillator circuit which would otherwise require a device such as a transformer to achieve the voltage gain necessary for oscillation.

Other combinations in accordance with the present invention can be used to vary the width of the rejection-filtering action shown in curves 180, 190. By connecting together in cascade two individual rejection assemblies that are arranged to separately reject adjacent frequencies, an overall rejection characteristic such as shown in curve 200 in FIG. 12 can be obtained. This particular characteristic is derived from a pair of assemblies schematically illustrated alongside curve 200. As noted, one of the units had a resistive coating of 100,000 ohms, distributive capacity of 0.0071 microfarad, and bridging capacitance of 426 micromicrofarads. The corresponding values for the other assembly were 119,000 ohms, 0.00672 microfarad, and 372 micromicrofarads. The first assembly by itself had an infinite rejection frequency of 2.32 kilocycles per second, the second of 2.23 kilocycles per second. Other values can be selected to even further widen the rejection band width. Also, one or more rejection filters may be combined with high and/ or low pass filters, or other filtering elements, to make band pass, band-reject, low pass, or high pass filters of desired characteristics.

The characteristics of the rejection filter may be further modified by tapering the distributed element as in FIG. 9. Depending on the direction of tapering, either a shaper or a broader notch may be obtained. Such tapered filters may also be combined in cascade with other tapered or untapered rejection filters and/or other filtering elements.

FIG. 17 shows a circuit component in the form of a filter which provides an attenuation having a slope of 10 db per decade. This circuit which is printed on a plate 280 includes a distributed element whose active electrodes are 285 and 286, and a lumped resistor 284. Connections are made to the two ends of the lumped resistor by means of conductive areas 288 and 289, to which are attached leads 281 and 282 respectively. Conductive area 288 is common to both the resistor 284 and to resistive area 285 which forms one electrode of the distributed element. Resistive area 285 extends to the edge of the plate and over the edge where it joins resistive area 286, forming a continuous folded resistive strip with the two halves in capacitive relationship. Resistive area 286 terminates in conductive strip 287 to which is connected lead 283. The combination of FIG. 17 can be used as a three terminal attenuation network, two of the possible means of connecting to the three terminals being especially useful. In the first of these, lead 283 is the input, lead 281 the output, and lead 282 is common to both circuits. With this connection for low frequencies, the attenuation is a constant value which does not change appreciably with frequency and there is substantially no phase shift through the device. For high frequencies, the attenuation through the device drops at the rate of 10 db per decade, and the output voltage leads the input voltage by 45°. The performance described is obtained to a fair approximation when resistor 284 has 1/10 or less the resistance measured between lead 281 and 283, i.e., the resistance of the distributed element. The transition between a constant attenuation and the attenuation characteristic rising at about 10 db per decade occurs when the product of frequency, resistance of the distributed element, and D.C. capacity of the distributed element equals approximately 0.25.

For example, if the distributed resistance is 1 megohm, the D.C. value of the distributed capacitance is 0.01 microfarad, and the value of the lumped resistor is 10,000 ohms, then the attenuation which is substantially constant with frequency below 25 cycles rises at approximately 10 db per decade at values appreciably above 25 cycles. This 10 db rise continues to well above 2500 cycles and is accompanied by a phase shift between input and output of approximately 45°. The fact that this device is capable of a 10 db slope of attenuation over wide frequency range is one of its advantages, as it is impossible to achieve this with any simple combination of lumped resistors and capacitors.

The second method of connecting the device illustrated in FIG. 17 is to use lead 282 as the input, lead 281 as the output and lead 283 as the common connection. When so connected, and when the resistance of the distributed element is less than the lumped resistor, or of the same order of magnitude, an attenuation is obtained whose attenuation increases at approximately 10 db per decade above a certain frequency. Also, above the same frequency, this attenuation has a constant phase shift of −45°. Below this frequency the attenuation is substantially constant, and the phase shift through the device is practically zero. If, for example, a lumped resistance of 10,000 ohms, a distributed resistance of 1,000 ohms, and a distributed capacitance of 0.01 microfarad are used, the transition region would occur at about 25 kilocycles.

Another circuit component in the form of a filter is shown in FIG. 18. This filter also is composed of a lumped element and a distributed element with one common terminal; all of which are mounted on supporting plate 300. Conducting areas 304 and 305 form the two plates of a lumped capacitor. To these conducting areas are attached, respectively, leads 302 and 303. Conducting area 304, in addition to forming one plate of the capacitor, is also connected to one end of the distributed element 307, 308. The other end of the distributed element is terminated at conductive strip 306 to which is connected lead 301. The distributed element 307, 308 is printed of some resistive material which extends over the end of the plate connecting the two resistive areas on each side of the plate.

In one method of utilizing this filter network, the input is connected to lead 303, the output is taken from lead 302, and lead 301 is common to both circuits. In this connection, a high pass filter is obtained which for low frequencies has an attenuation which decreases at 20 db per decade and in which the output leads the input lead by 90°. For mid-frequencies, a constant slope of less than 10 db per decade and a phase shift of less than 45° is produced over a considerable range. This slope approaches 10 db per decade when the ratio of distributed to lumped capacity is greater than about 20. At very high frequencies the filter has substantially no attenuation. The transition between the 20 db slope and the reduced slope occurs at approximately the point where the product of distributed capacity, distributed resistance, and frequency is 0.25. Connecting the filter of FIG. 18 with lead 301 as input lead, 302 as output, and lead 303 as the common connection gives a filter with zero attenuation at low frequencies and an attenuation which increases at 10 db per decade at high frequencies. At low frequencies, there is substantially no phase shift through the device, while at high frequencies, a constant −45° shift is maintained. During the transition region, phase shifts of a greater absolute magnitude than 45° are obtained, if the ratio of the lumped to the distributed capacity is greater than about one. The transition to a 45° angle occurs at approximately the same point as in the other connection for FIG. 18.

It is not necessary for the distributed element in FIGS. 17 and 18 to be made in exactly the form shown. It would be possible for one of the electrodes, i.e., either 285 or 286 in FIG. 17, or 308 or 307 in FIG. 18 to be made of conducting material. The operation would be unchanged, as long as the total resistance of the distributed element were the same in both cases.

It is also possible to replace one of the resistive electrodes of the distributed element by a conductive electrode and to make both connections to the distributed element on one side of the plate. In FIG. 17, this could be accomplished by making area 286 a conductive area which would not extend quite to the edge of the plate, and by connecting lead 283 to the end of area 285. No connection would be made between areas 286 and 285. The same variation would also be made in FIG. 18. The performance of the device with such a construction would be similar to the other constructions, except that the D.C. capacity of the distributed section would have to be four times as great for the same performance.

Similar attenuation characteristics to those obtained from the constructions of FIGS. 17 and 18 could be obtained using separate lumped components instead of, or in addition to, the lumped components printed on the plates, although this would not, as a rule, be the most economical construction. There are cases, however, where the lumped element is not easily separable from the circuit in which the distributed device is to be used. An example of this would be the case where the distributed component is used in conjunction with the collector resistance of a transistor to give attenuation characteristic similar to those cited above for the constructions of FIG. 17. In some cases it may be desirable to apply a low dielectric constant material under the lumped resistor 284 in FIG. 17 to reduce stray capacities, as was discussed in connection with FIGS. 1 and 2 above. It is also possible to taper the distributed elements in either FIG. 17 or FIG. 18 to modify the impedance characteristics of the distributed element and hence to alter the overall transfer characteristics of the filter. With no taper, the distributed element approaches a phase angle of −45° above a certain frequency, and its impedance decreases at the rate of 10 db per decade above this same frequency. It is this impedance characteristic that gives the distributed filter its desirable and unique characteristics. With a practical amount of tapering of the distributed element, its impedance characteristics may be modified so as to provide a high frequency slope of attenuation of from about 3 db to 17 db per decade, and a phase angle of from −15° to about −75°. The characteristics of the filters of FIGS. 17 and 18 will then be changed accordingly, with it being possible to maintain a ±15° to ±75° phase shift and a ±3 db to ±17 db per decade slope of attenuation over a wide range in the same manner that the ±45° phase shifts and ±10 db per decade slopes were maintained in the specific examples cited above.

The distributed element may be tapered no matter which of the various constructions described is used for the distributed element. In the construction shown in FIG. 17, for example, the resistive areas 285 and 286 could be tapered so that the narrow end of these areas would be at the edge of the plate where the two areas are joined. This distributed element would then have a rate of impedance decrease of greater than 10 db per decade, and an angle greater in absolute magnitude than 45°. Tapering in the opposite direction would give an angle of absolute magnitude less than 45° and a slope of less than 10 db per decade.

As the examples show, these filters are capable of giving constant positive or negative phase shifts of from 15 to 75° over wide ranges of frequencies. This is a valuable characteristic which cannot be achieved with any simple lumped filter. By combining these filters, any desired constant phase shift and the corresponding constant rate of attenuation change with frequency may be obtained.

Although throughout this discussion, the dielectric members have been disclosed as flat plates, it should be understood that other configurations, for example, tubular bodies, are within the scope of our invention.

Obviously many modifications and variations of the present invention are possible in the light of the above teachings. It is therefore to be understood that within the scope of the appended claims, the invention may be practiced otherwise than as specifically described.

What is claimed is:
1. A circuit combination having a dielectric stratum, separate elongated resistance layers opposing each other on opposite faces of the stratum, the layers being free of terminal connections except for a first terminal connection at one end of one layer, and a second terminal connection at the longitudinally opposite end of the other layer whereby the resistive and capacitive effects in said circuit combination are distributed over an appreciable area to provide a total capacity between said resistance layers and a total resistance between said first and second terminal connections, said stratum and layers in said circuit combination including means responsive to frequency changes over wide ranges of frequencies for establishing a capacitive reactance which is greater at the low frequencies in said range than in the high frequencies and a resistive impedance which predominates in the higher frequencies.

2. The combination of claim 1 in which the dielectric stratum is a plate of ceramic having a dielectric constant higher than 500 and a thickness no greater than 25 mils.

3. The combination of claim 1 in which the first terminal connection is to one tap of a resistance potentiometer.

4. The combination of claim 1 in which the dielectric stratum carries another pair of elongated coatings similarly connected, one of the connections for each pair being common.

5. The combination of claim 1 in which the resistance layers are tapered congruently.

6. The combination of claim 1 in which at least one of the resistance layers is carbonaceous.

7. The combination of claim 4 in which there is an amplification network connected with the terminal connections having transistor stages and having a coupling transformer connected to the common connection, an input conductor connected to one of the other terminal connections and an output transformer connected to the other terminal connection.

8. A combination of claim 3 in which the resistance potentiometer is carbonaceous.

References Cited in the file of this patent

UNITED STATES PATENTS

| | | |
|---|---|---|
| 2,064,658 | Liebman | Dec. 22, 1936 |
| 2,126,915 | Norton | Aug. 16, 1938 |
| 2,375,097 | Gaige | May 1, 1945 |
| 2,461,658 | Roup | Feb. 15, 1949 |
| 2,521,513 | Gray | Sept. 5, 1950 |
| 2,536,501 | Hood et al. | Jan. 2, 1951 |
| 2,549,424 | Carlson et al. | Apr. 17, 1951 |
| 2,630,491 | Waltz | Mar. 3, 1953 |
| 2,637,777 | Kilby | May 5, 1953 |
| 2,637,778 | Kodama | May 5, 1953 |
| 2,673,961 | Williamson | Mar. 30, 1954 |
| 2,694,184 | Rounds | Nov. 9, 1954 |
| 2,694,185 | Kodama | Nov. 9, 1954 |
| 2,734,173 | Ogurkowski | Feb. 7, 1956 |
| 2,810,024 | Stanley | Oct. 15, 1957 |
| 2,812,390 | Van Overbeek | Nov. 5, 1957 |
| 2,828,454 | Khouri | Mar. 25, 1958 |